United States Patent [19]

Bade et al.

[11] 4,403,225

[45] Sep. 6, 1983

[54] MULTISTYLUS RECORDING SYSTEM

[75] Inventors: Edward R. Bade, Evergreen; Paul A. Diddens, Denver, both of Colo.

[73] Assignee: Honeywell, Inc., Minneapolis, Minn.

[21] Appl. No.: 381,597

[22] Filed: May 24, 1982

[51] Int. Cl.³ .............................................. G01D 9/12
[52] U.S. Cl. ...................................................... 346/35
[58] Field of Search ............ 346/34, 35, 76 R, 76 PH; 219/216 PH

[56] References Cited

U.S. PATENT DOCUMENTS

| | | | |
|---|---|---|---|
| 3,564,537 | 2/1971 | Lee .................................... | 346/35 X |
| 4,141,018 | 2/1979 | Mizuguchi et al. ............ | 346/76 PH |
| 4,145,697 | 3/1979 | Ballinger ............................. | 346/35 |
| 4,216,481 | 8/1980 | Hakoyama ...................... | 346/76 PH |
| 4,224,869 | 9/1980 | Morin .......................... | 346/76 PH X |
| 4,335,968 | 6/1982 | Regnault .................... | 346/76 PH X |

Primary Examiner—Donald A. Griffin
Attorney, Agent, or Firm—M. J. Halista; C. J. Ungemach

[57] ABSTRACT

A multistylus recorder uses a recording head having a plurality of side-by-side styli extending across the width of a recording medium which is driven at right angles to the recording head. The recording styli are individually energized to provide a recording on the recording medium using a digital control system for storing addresses of the recording styli to be energized whereby the recording styli are energized from the lowest to highest stored addresses. The recording system uses a minimum to maximum, min-max, accumulator to configure the digital data obtained from an analog-to-digital (A/D) converter representative of an input signal applied to the A/D converter into a format suitable for energizing the multistylus recording head, i.e., the min-max accumulator accepts and stores the digitized values obtained by sampling an input signal by the A/D converter and a sample and hold circuit to obtain a plurality of samples between recording operations to produce a plurality of outputs for energizing each of the plurality of recording styli. The min-max accumulator stores all of the digitized samples of the input data, selects the minimum and maximum digitized values of the input sample, produces stylus addresses for those values and energizes all of the styli between and including the lowest and highest stylus address received since the preceding recording cycle.

9 Claims, 14 Drawing Figures

CHART MOTION

CHART MOTION

CHART MOTION

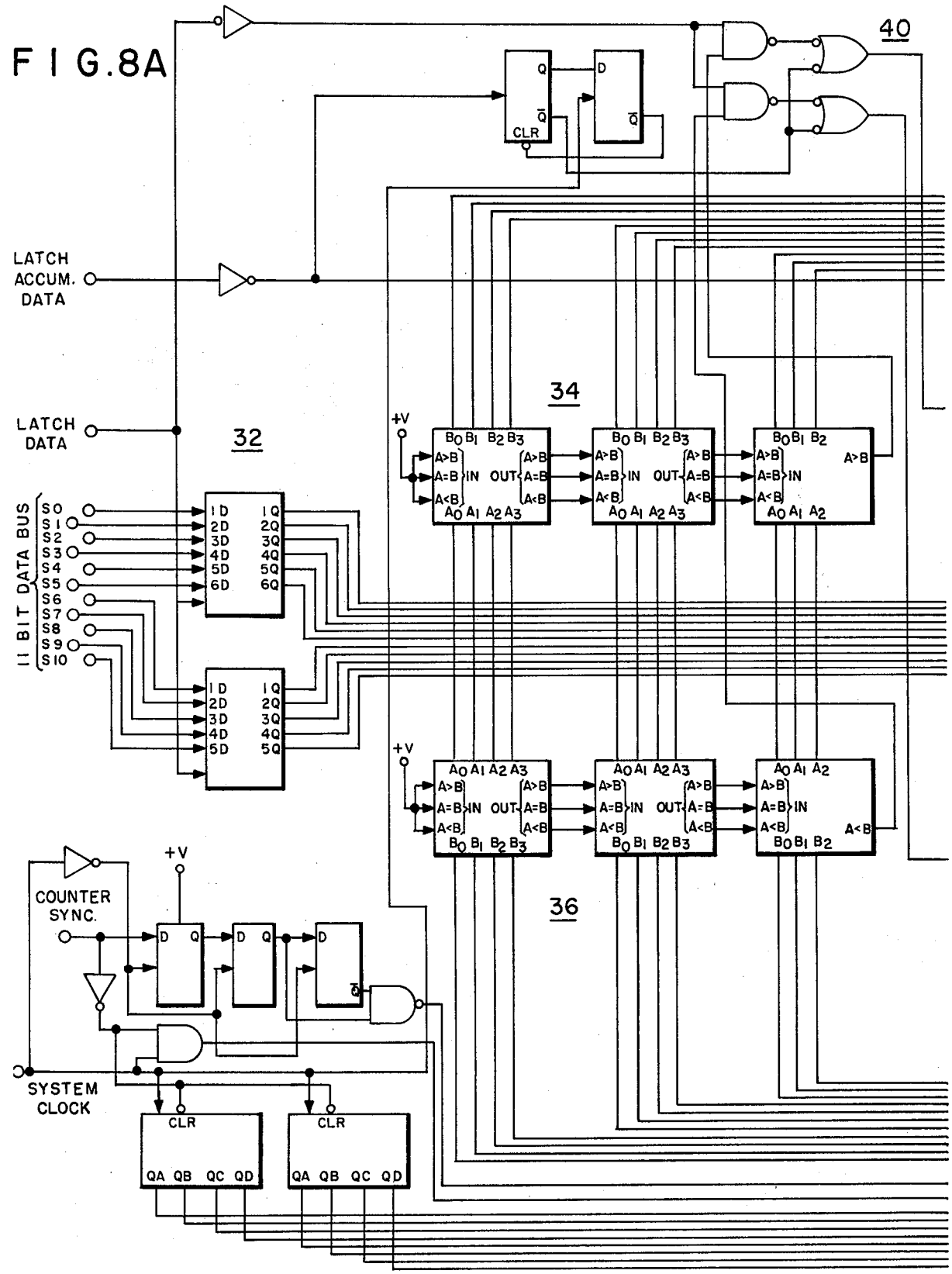

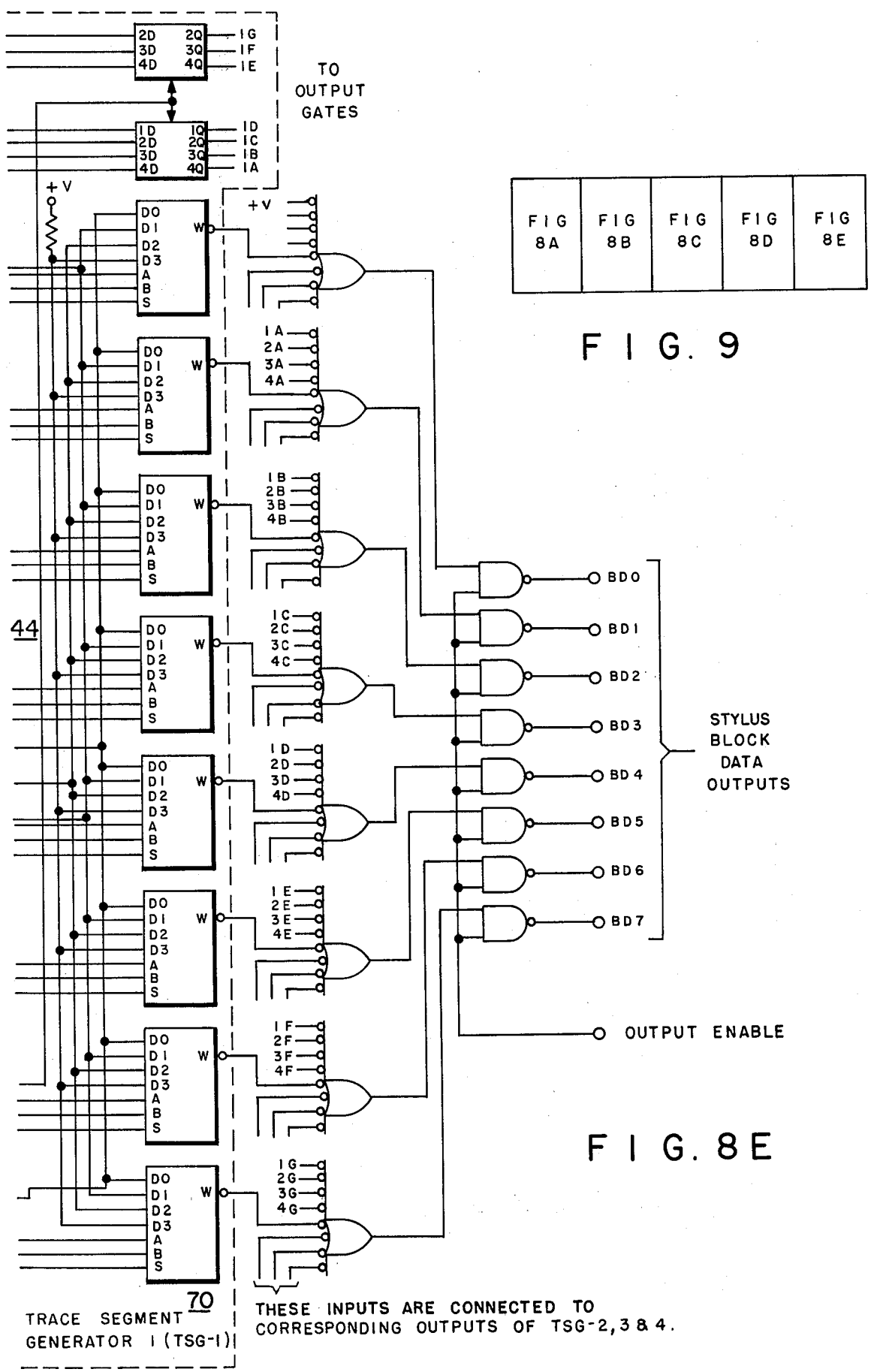

FIG. 10

DATA SELECT KEY

| A | B | DATA |
|---|---|------|
| 0 | 0 | LOW EDGE BUS-LEB |
| 0 | 1 | BOTH EDGE BUS-BEB |
| 1 | 0 | HIGH EDGE BUS-HEB |
| 1 | 1 | ALL WRITE BUS-AWB |

INPUTS / OUTPUTS

| H10 | H9 | H8 | L10 | L9 | L8 | BE0 | BE1 | BE2 | BE3 | BE4 | BE5 | BE6 | BE7 | A0 | B0 | A1 | B1 | A2 | B2 | A3 | B3 | A4 | B4 | A5 | B5 | A6 | B6 | A7 | B7 |
|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 1 | 1 | 1 | 1 | 1 | 1 | 1 | 0 | 1 | | | | | | | | | | | | | | |
| 0 | 0 | 1 | 0 | 0 | 0 | 0 | 0 | 1 | 1 | 1 | 1 | 1 | 1 | 0 | 0 | 1 | 0 | | | | | | | | | | | | |
| 0 | 0 | 1 | 0 | 0 | 1 | 1 | 0 | 1 | 1 | 1 | 1 | 1 | 1 | | | 0 | 1 | | | | | | | | | | | | |
| 0 | 1 | 0 | 0 | 0 | 0 | 0 | 0 | 0 | 1 | 1 | 1 | 1 | 1 | 0 | 0 | 1 | 1 | 1 | 0 | | | | | | | | | | |
| 0 | 1 | 0 | 0 | 0 | 1 | 1 | 0 | 0 | 1 | 1 | 1 | 1 | 1 | | | 0 | 0 | 1 | 0 | | | | | | | | | | |
| 0 | 1 | 0 | 0 | 1 | 0 | 1 | 1 | 0 | 1 | 1 | 1 | 1 | 1 | | | | | 0 | 1 | | | | | | | | | | |
| 0 | 1 | 1 | 0 | 0 | 0 | 0 | 0 | 0 | 0 | 1 | 1 | 1 | 1 | 0 | 0 | 1 | 1 | 1 | 1 | 1 | 0 | | | | | | | | |
| 0 | 1 | 1 | 0 | 0 | 1 | 1 | 0 | 0 | 0 | 1 | 1 | 1 | 1 | | | 0 | 0 | 1 | 1 | 1 | 0 | | | | | | | | |
| 0 | 1 | 1 | 0 | 1 | 0 | 1 | 1 | 0 | 0 | 1 | 1 | 1 | 1 | | | | | 0 | 0 | 1 | 0 | | | | | | | | |
| 0 | 1 | 1 | 0 | 1 | 1 | 1 | 1 | 1 | 0 | 1 | 1 | 1 | 1 | | | | | | | 0 | 1 | | | | | | | | |
| 1 | 0 | 0 | 0 | 0 | 0 | 0 | 0 | 0 | 0 | 0 | 1 | 1 | 1 | 0 | 0 | 1 | 1 | 1 | 1 | 1 | 1 | 1 | 0 | | | | | | |
| 1 | 0 | 0 | 0 | 0 | 1 | 1 | 0 | 0 | 0 | 0 | 1 | 1 | 1 | | | 0 | 0 | 1 | 1 | 1 | 1 | 1 | 0 | | | | | | |
| 1 | 0 | 0 | 0 | 1 | 0 | 1 | 1 | 0 | 0 | 0 | 1 | 1 | 1 | | | | | 0 | 0 | 1 | 1 | 1 | 0 | | | | | | |
| 1 | 0 | 0 | 0 | 1 | 1 | 1 | 1 | 1 | 0 | 0 | 1 | 1 | 1 | | | | | | | 0 | 0 | 1 | 0 | | | | | | |
| 1 | 0 | 0 | 1 | 0 | 0 | 1 | 1 | 1 | 1 | 0 | 1 | 1 | 1 | | | | | | | | | 0 | 1 | | | | | | |
| 1 | 0 | 1 | 0 | 0 | 0 | 0 | 0 | 0 | 0 | 0 | 0 | 1 | 1 | 0 | 0 | 1 | 1 | 1 | 1 | 1 | 1 | 1 | 1 | 1 | 0 | | | | |
| 1 | 0 | 1 | 0 | 0 | 1 | 1 | 0 | 0 | 0 | 0 | 0 | 1 | 1 | | | 0 | 0 | 1 | 1 | 1 | 1 | 1 | 1 | 1 | 0 | | | | |
| 1 | 0 | 1 | 0 | 1 | 0 | 1 | 1 | 0 | 0 | 0 | 0 | 1 | 1 | | | | | 0 | 0 | 1 | 1 | 1 | 1 | 1 | 0 | | | | |
| 1 | 0 | 1 | 0 | 1 | 1 | 1 | 1 | 1 | 0 | 0 | 0 | 1 | 1 | | | | | | | 0 | 0 | 1 | 1 | 1 | 0 | | | | |
| 1 | 0 | 1 | 1 | 0 | 0 | 1 | 1 | 1 | 1 | 0 | 0 | 1 | 1 | | | | | | | | | 0 | 0 | 1 | 0 | | | | |
| 1 | 0 | 1 | 1 | 0 | 1 | 1 | 1 | 1 | 1 | 1 | 0 | 1 | 1 | | | | | | | | | | | 0 | 1 | | | | |
| 1 | 1 | 0 | 0 | 0 | 0 | 0 | 0 | 0 | 0 | 0 | 0 | 0 | 1 | 0 | 0 | 1 | 1 | 1 | 1 | 1 | 1 | 1 | 1 | 1 | 1 | 1 | 0 | | |
| 1 | 1 | 0 | 0 | 0 | 1 | 1 | 0 | 0 | 0 | 0 | 0 | 0 | 1 | | | 0 | 0 | 1 | 1 | 1 | 1 | 1 | 1 | 1 | 1 | 1 | 0 | | |
| 1 | 1 | 0 | 0 | 1 | 0 | 1 | 1 | 0 | 0 | 0 | 0 | 0 | 1 | | | | | 0 | 0 | 1 | 1 | 1 | 1 | 1 | 1 | 1 | 0 | | |
| 1 | 1 | 0 | 0 | 1 | 1 | 1 | 1 | 1 | 0 | 0 | 0 | 0 | 1 | | | | | | | 0 | 0 | 1 | 1 | 1 | 1 | 1 | 0 | | |
| 1 | 1 | 0 | 1 | 0 | 0 | 1 | 1 | 1 | 1 | 0 | 0 | 0 | 1 | | | | | | | | | 0 | 0 | 1 | 1 | 1 | 0 | | |
| 1 | 1 | 0 | 1 | 0 | 1 | 1 | 1 | 1 | 1 | 1 | 0 | 0 | 1 | | | | | | | | | | | 0 | 0 | 1 | 0 | | |
| 1 | 1 | 0 | 1 | 1 | 0 | 1 | 1 | 1 | 1 | 1 | 1 | 0 | 1 | | | | | | | | | | | | | 0 | 1 | | |
| 1 | 1 | 1 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 0 |
| 1 | 1 | 1 | 0 | 0 | 1 | 1 | 0 | 0 | 0 | 0 | 0 | 0 | 0 | | | 0 | 0 | 1 | 1 | 1 | 1 | 1 | 1 | 1 | 1 | 1 | 1 | 1 | 0 |
| 1 | 1 | 1 | 0 | 1 | 0 | 1 | 1 | 0 | 0 | 0 | 0 | 0 | 0 | | | | | 0 | 0 | 1 | 1 | 1 | 1 | 1 | 1 | 1 | 1 | 1 | 0 |
| 1 | 1 | 1 | 0 | 1 | 1 | 1 | 1 | 1 | 0 | 0 | 0 | 0 | 0 | | | | | | | 0 | 0 | 1 | 1 | 1 | 1 | 1 | 1 | 1 | 0 |
| 1 | 1 | 1 | 1 | 0 | 0 | 1 | 1 | 1 | 1 | 0 | 0 | 0 | 0 | | | | | | | | | 0 | 0 | 1 | 1 | 1 | 1 | 1 | 0 |
| 1 | 1 | 1 | 1 | 0 | 1 | 1 | 1 | 1 | 1 | 1 | 0 | 0 | 0 | | | | | | | | | | | 0 | 0 | 1 | 1 | 1 | 0 |
| 1 | 1 | 1 | 1 | 1 | 0 | 1 | 1 | 1 | 1 | 1 | 1 | 0 | 0 | | | | | | | | | | | | | 0 | 0 | 1 | 0 |
| 1 | 1 | 1 | 1 | 1 | 1 | 1 | 1 | 1 | 1 | 1 | 1 | 1 | 0 | | | | | | | | | | | | | | | 0 | 1 |

\* ALL BLANKS ARE "DON'T CARE"

MULTISTYLUS RECORDING SYSTEM

BACKGROUND OF THE INVENTION

Field of the Invention

The present invention relates to data recorders. More specifically, the present invention is directed to data recorders using a multistylus recording head.

SUMMARY OF THE INVENTION

An object of the present invention is to provide an improved data recorder using a multistylus recording head.

In accomplishing this and other objects, there has been provided, in accordance with the present invention a multistylus recording system including a multistylus recording head extending across a recording medium, an input signal means for sampling an analog signal to be recorded, analog-to-digital conversion means for producing a digital representation of the samples of the input signal to be recorded and digitized sample accumulator means for translating the digitized samples into styli addresses and for energizing during a recording operation the recording styli between and including the lowest and highest stylus addresses received and stored by the accumulator since the preceding recording operation.

BRIEF DESCRIPTION OF THE DRAWINGS

A better understanding of the present invention may be had when the following detailed description is read in connection with the accompanying drawings, in which:

FIG. 9 is a diagram showing the interrelationship of FIGS. 8A, to 8E, and FIG. 10 is a diagram of the data storage pattern in the ROM's used in FIGS. 7 and 8.

DESCRIPTION OF THE PREFERRED EMBODIMENT

Figure 1:
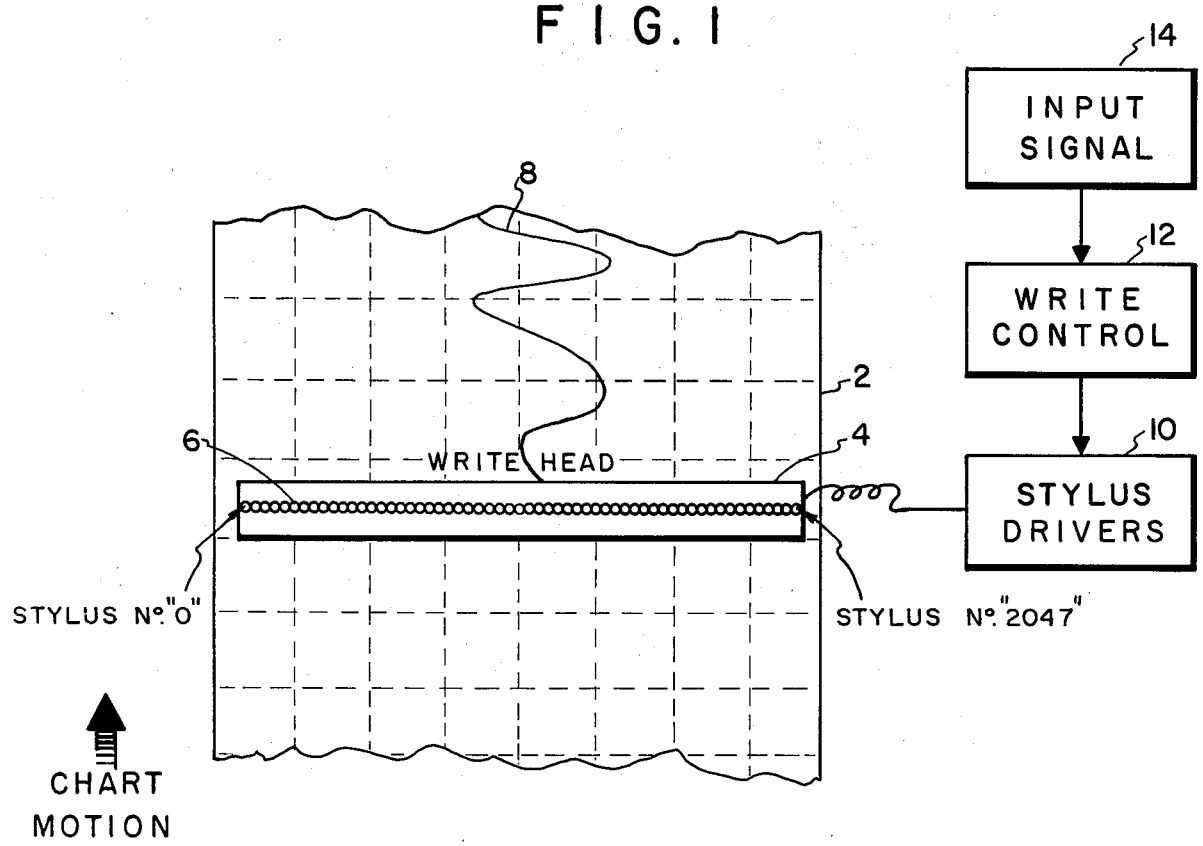
FIG. 1 is a pictorial illustration of a multistylus recording system for use with the present invention.

Referring to FIG. 1 in more detail, there is shown a multistylus recording system for recording on a moving recording medium 2 using any well-known recording process, e.g., spark, electrostatic, etc. A multistylus recording head 4 having a plurality of side-by-side recording styli 6 is arranged to define a recording line across the width of the medium 2 at a right angle to the motion of the recording medium 2. The illustrated recording head 4 is shown with 2048 styli which are numbered 0 to 2047 from left to right as viewed in FIG. 1. The selective energization of the recording styli 6 is effective to produce the recorded trace 8 on the recording medium 2. A plurality of stylus drivers 10 are arranged to energize the recording styli 6 under control of a recording control 12 in response to an input signal supplied from an input signal source 14.

Figure 2:
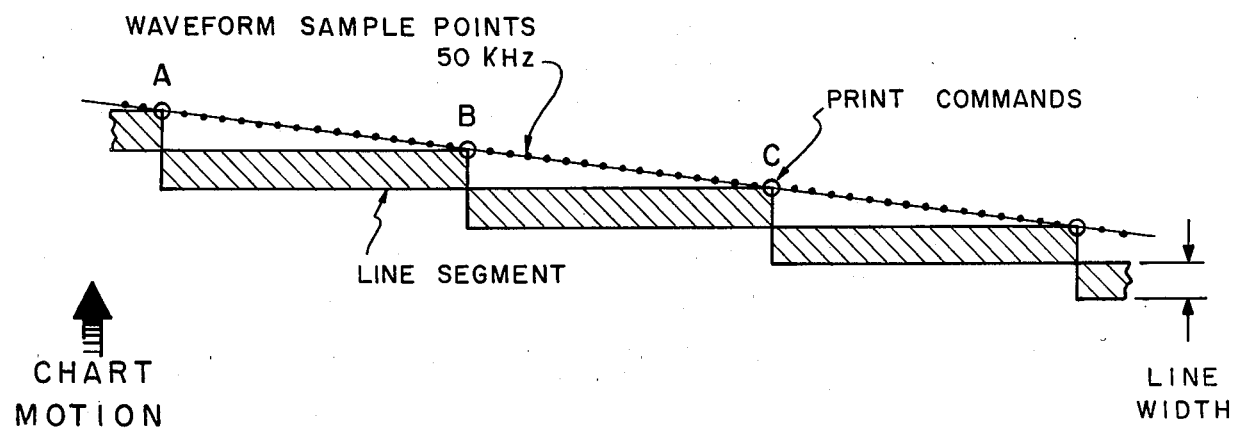
FIG. 2 is an enlarged view of a segment of a first recording produced by the multistylus recording system shown in FIG. 1.
Figure 3:
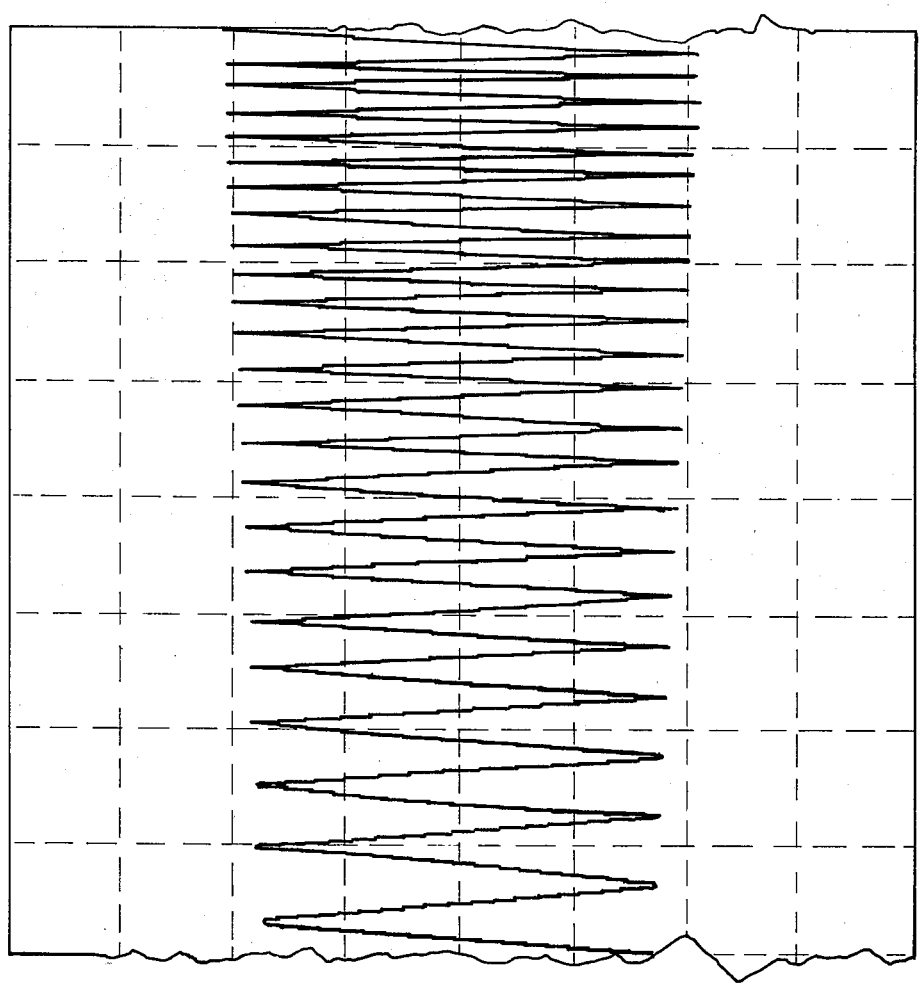
FIG. 3 is a portion of a recording produced by the recording technique shown in FIG. 2.

In FIG. 2, there is shown a portion of a first recording of an analog input signal produced by a multistylus head recording system which is arranged to energize the recording head 4 shown in FIG. 1. The input analog waveform is sampled at a relatively high frequency, e.g., 50 KHz, and print commands A, B, C are periodically issued. The line segments recorded between print commands A, B, C form the recorded trace 8 on the recording medium 2. The line width or thickness of the line segments is equal to the spacing of the recording commands A, B, C which are spaced at predetermined intervals of recording medium movement, e.g., 5 mils. Thus, the input signal is sampled many times between any two adjacent print commands, and all of the sampled data points are stored. At the time of the print command, all writing head styli between the two adjacent print commands are energized. Thus, not only the styli corresponding to the sampled data points between the print commands are energized but also all of the styli between. Thus, a continuous line segment is recorded between print commands, i.e., one write cycle. This process is periodically repeated during the recording of the input signal to construct a representation of the original wave form. However, as may be seen from the hereto, the individual line segments are very prominent. In FIG. 3, there is shown a portion of a recording of an input signal using the technique shown in FIG. 2. As may be seen from FIG. 3, the actual shape of the input signal as represented by the recording is significantly distorted due to the prominence of the individual recorded segments whereby features or characteristics of an input wave form may be lost in the recording.

Figure 4:
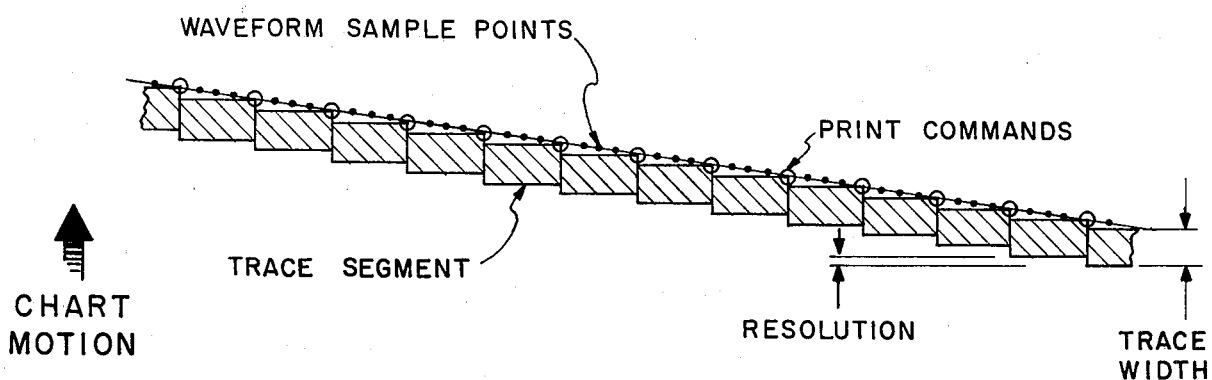
FIG. 4 is an enlarged view of a segment of a second recording produced by a multistylus recording system shown in FIG. 1 and embodying the present invention.
Figure 5:
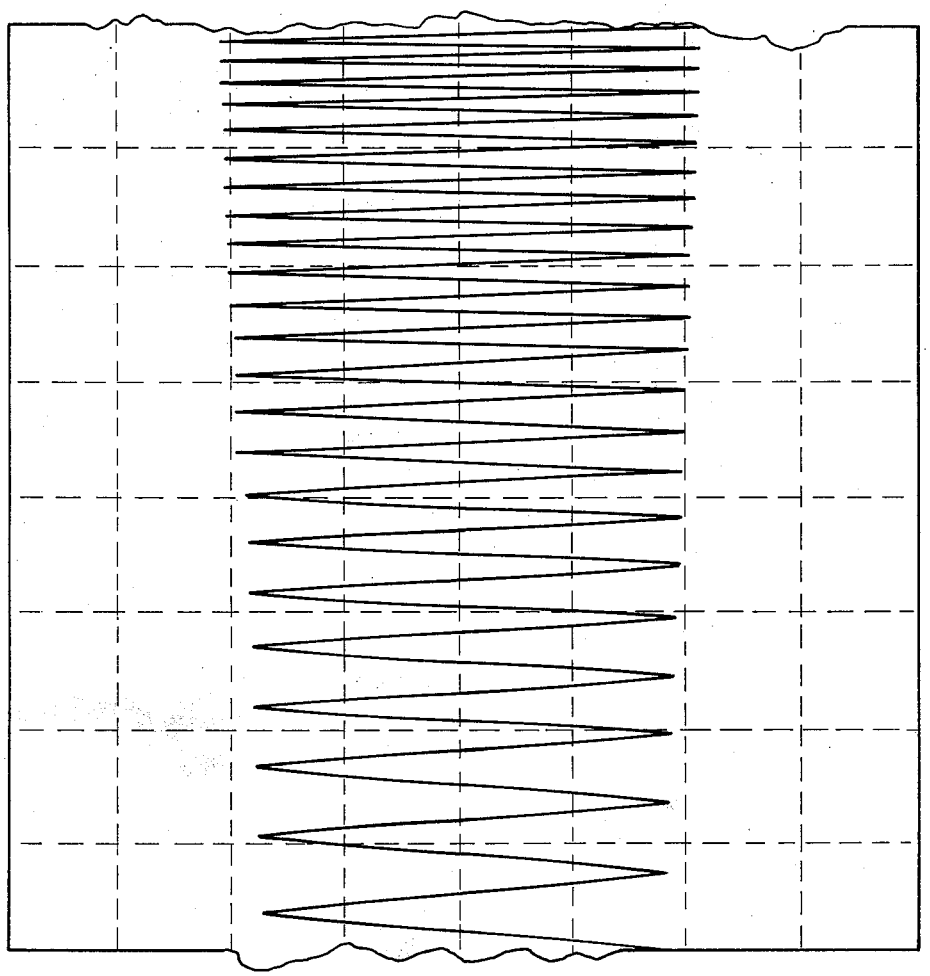
FIG. 5 is a portion of a recording produced in accordance with the technique shown in FIG. 4.

In order to produce a better replica of the input wave form, the present invention significantly increases the resolution of the recording. In FIG. 4, there is shown a technique for recording the line segments in a format which greatly improves the quality or accuracy of the recorded trace. In this format, the trace segments are recorded with a much smaller increment of recording medium movement, e.g., 1.25 mils which defines a write cycle. Additionally, the trace segments are retained at the former width, e.g., 5 mils, whereby the segments now overlap, i.e., each segment is four write cycles long, to produce a recording trace which significantly improves the reproduction of the input wave form. A portion of a recording using the technique shown in FIG. 4 is shown in FIG. 5. This recording format produces a recording trace which is very similar to one produced by a pen recorder and, accordingly, eliminates the distortion produced by the recording technique shown in FIG. 3.

Figure 6:
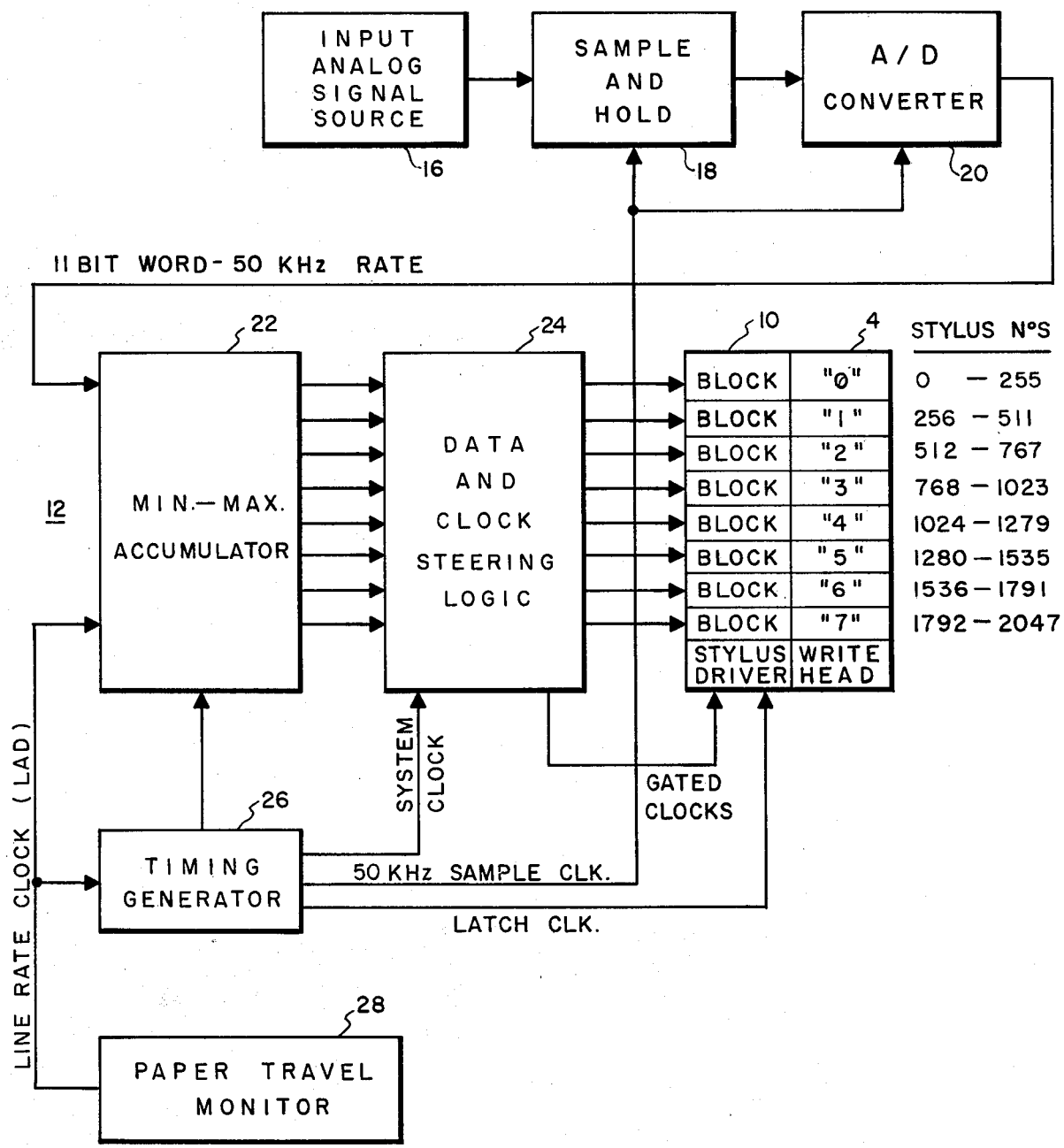
FIG. 6 is a block diagram of an example of a multistylus recording system embodying an example of the present invention.

In FIG. 6, there is shown a block diagram of an example of a multistylus recording system embodying an example of the present invention to produce the recording shown in FIG. 5. The input signal source 14 includes an input analog signal source 16 which is arranged to apply an input signal to be recorded to a sample and hold circuit 18. The output of the sample and hold circuit 18 is applied to the input of an analog-to-digital converter 20 where each sample of the input analog signal is converted to an eleven bit word at the 50 KHz rate mentioned above as an example of the operation of the system. This eleven bit word for each sample is applied to a min-max accumulator 22 which accepts and stores the digitized samples. The min-max accumulator 22 translates the stored samples into eight output signals which are applied to a data and steering logic circuit 24 to control the stylus drivers 10 for energizing the recording head 4. The use of eight outputs from the min-max accumulator reduces the clock rate used within the min-max accumulator 22 by simultaneously driving eight blocks of styli. Thus, each output signal is arranged to control a block of 256 styli with a serial pulse train of 256 counts to reduce the clock rate by a factor of eight. Specifically, the min-max accumulator outputs and a clock signal obtained from a timing generator 26 are applied through the data and clock steering logic 24 to load sixty-four stylus drivers in the stylus driver circuit 10 with each stylus driver having thirty-two stages, i.e., a total of 2048 stages. These drivers are used to drive or energize their associated styli 6 in the recording head 4.

The timing generator 26 also produces the 50 KHz sample clock for the sample and hold 18 and the A/D converter 20 as well as clock signals for the min-max accumulator 22 and the stylus driver 10. A recording medium travel monitor 28 produces a line rate clock signal every 1.25 mils of recording medium movement. This clock signal is applied to the timing generator 26 and the min-max accumulator 22. The min-max accumulator 22 stores all of the input data applied thereto and recognizes the minimum-maximum values of the input signals. When the line rate clock from the monitor 28 occurs, the min-max accumulator 22 energizes all of the styli 6 between and including the lowest and highest stylus address produced since the preceding line rate clock signal from the monitor 28. Thus, a line segment is recorded by energizing all of the styli between and including the lowest and highest address produced since the previous write cycle. In summary, the stylus assembly 4 is energized in eight equal blocks of 256 styli each with all of the blocks being driven or addressed simultaneously. This enables the clock rate for the min-max accumulator 22 to be one-eighth of that necessary for scanning sequentially all 2048 stylus addresses. Since the eight blocks of styli are addressed simultaneously, the high and low address information is used to set up the min-max accumulator 22 for the actual clocking, i.e., a 256 count, through the 256 addresses for each block.

The operation of the min-max accumulator 22 may be described using three operating modes for properly addressing the styli. In the first operating mode, the lowest and highest addresses acquired from the input samples since the last write cycle fall within the block of styli identified as block "zero" in FIG. 6. This block addresses the styli between "0" and "255". The min-max accumulator 22 recognizes that both addresses fall within block "zero" and selects an internal signal bus called Both Edge Bus (BEB). This signal is set at a predetermined level, e.g., a low level, at the block "zero" output from the min-max accumulator 22 at the low address and at a second level, e.g., a high level, when the high address is recognized.

In the second operating mode, the low and high addresses indicate that the low signal address is in block "zero" and the high address is in block "one" with block "one" driving styli "256" to "511". In this mode, the Low Edge Bus (LEB) is selected from block "zero" and the High Edge Bus (HEB) is selected for block "one". The following example is directed to a recording wherein the styli from stylus "100" to stylus "300" are to be energized. In this example, the block "one" control or the HEB from the min-max accumulator 22 is immediately set to a low value to start loading driver registers for styli "256" and up since block "one" starts with stylus No. "256". When the 256 styli count advances to stylus "300" in block "one" since block "one" starts with stylus No. "256", the block "one" HEB signal goes "high" to stop loading of registers for styli above "300" in block "one" whereby the stylus locations "256" to "300" are now selected for recording. The "256" count continues to advance until it reaches the address for stylus "100" in block "zero", the preceding count from 0 to 99 having had no effect on block "zero". At this time the block "zero" LEB signal goes "low" which starts loading register locations starting with stylus "100" in the block "zero". The block "zero" LEB signal stays "low" until the end of the count of the 256 clock signal which results in an addressing of all styli registers from "100" to "255". All of the addressed styli are subsequently enabled in blocks "0" and "1" by the latch clock pulse from the timing generator 26 and a record trace is written extending from stylus "100" to stylus "300" in the recording head 4.

The third example is one in which more than two adjacent blocks of the styli in the head 4 are to be energized, i.e., the record segment is to extend over more than two blocks of styli. For example, if the low address indicates a starting stylus in block "zero" and a high address indicates an "N" stylus in block "two", then all of the styli in block "one" must also be energized. In this mode of operation, in addition to the LEB and HEB buses, an all write bus (AWB) is selected by the min-max accumulator 22 to write all of the styli in block "one". Thus, when the 256 count clock starts, the AWB signal causes the block "one" output from the min-max accumulator 22 to be low and to stay low throughout the full 256 clock count. Thus, all of the styli in block "one" (styli "256" to "511") are selected. The block "zero" and block "two" addresses are produced as described above for the second mode of operation.

DATA COLLECTION AND PROCESSING

Figure 7:
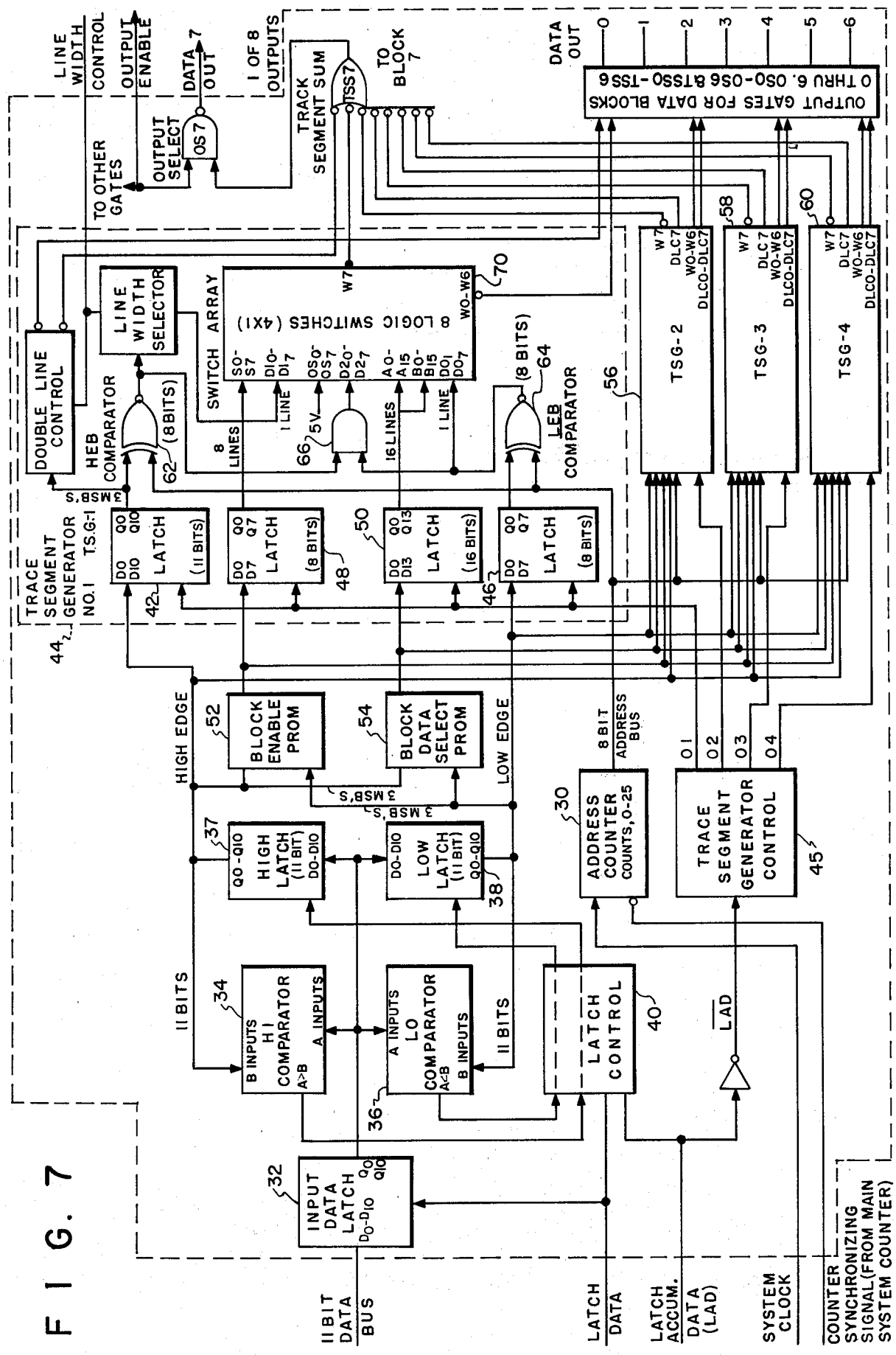
FIG. 7 is a block diagram of a circuit suitable for use as the min-max accumulator shown in FIG. 6, FIGS. 8A to 8E are a detailed block diagram of the min-max accumulator shown in FIG. 7.

In FIG. 7, there is shown a block diagram of the min-max accumulator 22. The basic clock signal which controls the min-max accumulator 22 is generated using a counter which counts from zero to 272 in the timing generator 26. The first function performed in the min-max accumulator 22 is the clearing of the address counter 30 at a count of 255. At a count of 256, the input data latch (IDL) 32 which is monitoring the eleven bit data bus receives a Latch Data (LD) signal to load the input data into the latch 32. Once the eleven bit word for a digitized data sample from the A/D converter 20 is latched or loaded into the IDL 32, the high comparator 34 and the low comparator 36 compare the new word with the previous data words loaded into the high latch 37 and the low latch 38. If the new word is larger than that stored in the high latch 37, the high comparator 34 produces an output signal which is applied to a latch control 40 to direct the replacement of the contents of the high latch 37 with the new word. If the new word is smaller than that stored in the low latch 38, the low comparator 36 produces an output signal for the latch control 40 to direct the replacement of the contents of the low latch 38 with the new word. If the new word is neither larger than that stored in the high latch 37 nor smaller than that stored in the low latch 38, no change is made in the contents thereof. This process is repeated for each new eleven bit word which is loaded into the input data latch 32. Accordingly, the high latch 37 always contains the highest value of the words representing the data samples and the low latch 38 always contains the lowest value of the sampled data words.

After the recording medium has moved the predetermined distance, a latch accumulator data pulse (LAD) is generated by the recording medium travel monitor 28. The leading edge of this pulse loads the data from the high latch 37 into a first storage latch 42 of the first trace segment generator 44 (TSG-1) using the $\emptyset1$ control signal from a trace segment generator control 45. Concurrently, the data from the low latch 38 is loaded into a second storage latch 46 in the first trace segment generator 44. A third storage latch 48 and a fourth storage latch 50 of the trace segment generator 44 are loaded from the outputs of a block enable PROM 52 (BEP) and a block data select PROM 54 (BDSP) which decode the three most significant bits (3 MSB's) of the eleven bit data in the high and low latches 36, 38, respectively, as described more fully hereinafter. These four storage latches 42, 46, 48, 50 now contain all of the data needed by the first trace generator 44 to write a trace segment four write cycles long. The trailing edge of the latch accumulator data (LAD) pulse loads the last sample taken back into the high latch 36 and the low latch 38 through the latch control 40. This process is repeated for the second trace segment generator 56 (TSG-2), the third trace segment generator 58 (TSG-3), and the fourth trace segment generator 60 (TSG-4) with the next three batches of input data using the $\emptyset2, \emptyset3$, and $\emptyset4$ signals from the trace segment generator control 45. The cycle then starts over with the first generator 44 being loaded. Since the latch accumulate data (LAD) pulses occur every 1.25 mils of recording medium movement, and since each trace segment generator holds and writes its data for four LAD pulses, the trace segment written on the chart is the desired width of 5 mils to produce the overlap shown in FIG. 4.

TRACE SEGMENT GENERATOR OPERATION

The four trace segment generators 44, 56, 58 and 60 are addressed by the address counter 30. This counter is synchronized by a 10.24 MHz clock signal from the timing generator 26 to control an 8-bit address bus which is connected to a High Edge Bus (HEB) comparator 62 and a Low Edge Bus (LEB) comparator 64. Each comparator consists of eight exclusive NOR gates. The address counter 30 counts from 000 to 255 once every 20 microseconds. The HEB and LEB comparators 62 and 64 compare the outputs of the storage latches 42 and 46 with the 8-bit address from the address counter 30. When the address on the address bus from the address counter 30 agrees with the contents of either of the storage latches 42 and 46 the output of the associated one of the comparators 62, 64 is set to a predetermined level until the count on the address bus exceeds 255. Specifically, the output of the LEB comparator 64 called Low Edge Bus (LEB) stays high after an equality is detected while the output of the HEB comparator 62 called High Edge Bus (HEB) stays low after an equality is detected. If the high and low addresses acquired by the input since the last LAD signal both fall into the same block of 256 styli, the contents of the first storage latch 42 will always have a higher numbered address than the contents of the second storage latch 46. If the high and low addresses in the latches 42 and 46 fall into different blocks of styli, latch 46 may have a higher numbered address than latch 42.

The outputs of the comparators 62 and 64 are monitored by an AND gate 66. This gate provides an output signal which goes high when the output from the LEB comparator 64 goes high and which goes low when the output signal from the HEB comparator 62 goes low. This output signal is called the Both Edge Bus (BEB). A switch array 70 in each of the trace segment generators contains eight data selectors, one for each of the $\overline{\text{Data Out}}$ signals for blocks "zero" thru "seven". Each data selector is controlled by a Select Block line and two Data Select lines. The Select Block lines determine which data selectors are to be enabled. The two Data Select lines determine which of the inputs $D_0$ to $D_3$ are to be activated which in turn, determines whether bus LEB, HEB, BEB or AWB is to be selected. The control lines to the data selectors come from the third and fourth storage latches 48, 50 which hold the data acquired from the BEB PROM 52 and the BDSP PROM 54. In FIG. 10, there is shown the plan of the encoding data resident in the PROMS 52 and 54. For example, assume that both high and low addresses in latches LL38 and HL36 are between 000 and 255 when the LAD pulse occurs. Referring to the top line in FIG. 10, Low Latch MSB's are $L_8$, $L_9$ and $L_9$ or 000. The BEP Prom, accordingly, generates in response to these inputs a low output on output BEO. This signal enables Data Selector "0" in the Trace Segment Generator being addressed at that time. Since $A_0=0$ and $B=1$, the Data Selector "0" selects the BEB bus which is the correct bus to write entirely within one block. Another example involves writing in three blocks which is the fourth line from the top where $L_8$, $L_9$ and $L_{10}=000$ and $H_8$, $H_9$ and $H_{10}=010$. Then $BE_0$, $BE_1$ and $BE_1$ are all zero to enable Data Selectors 0, 1 and 2. As a result, $A_0$, $B_0=00$ which selects LEB; $A_1$, $B_1=11$ which selects AWB and $A_2$, $B_2=10$ which selects HEB as the correct combination for writing in blocks "zero", "one" and "two".

The outputs $W_0$–$W_7$ are OR'd together in the Trace Segment Sum gates TSS-0 through TSS-7. The outputs of these gates drive one input of respective ones of Onput Select gates OS1 through OS7. The select inputs of gates OS1 through OS7 are tied together to an Output Enable bus supplying an external input to the min-max accumulator whereby a low input disables the min-max accumulator to prevent the production of an output.

Figure 8B:
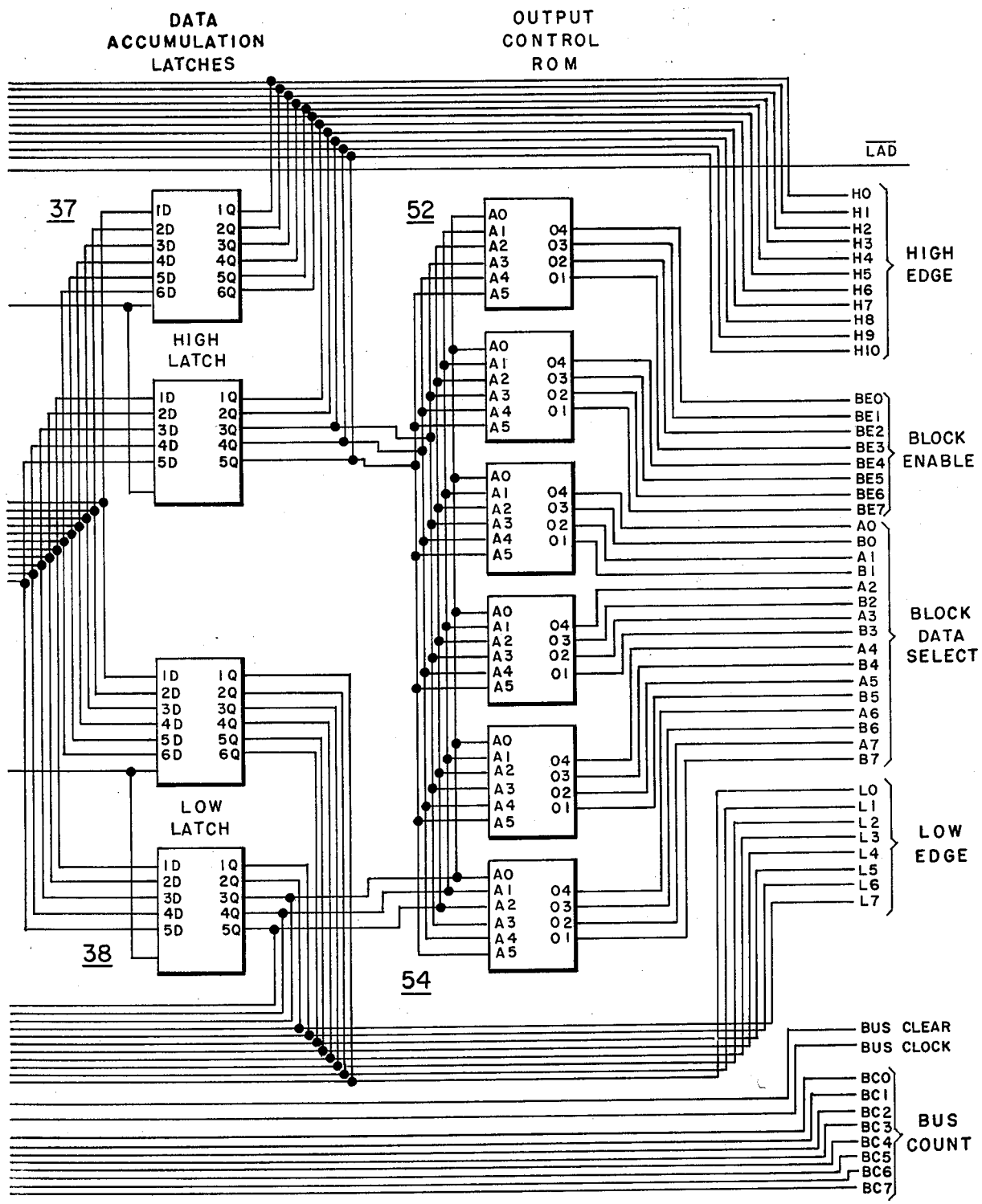
Figure 8C:
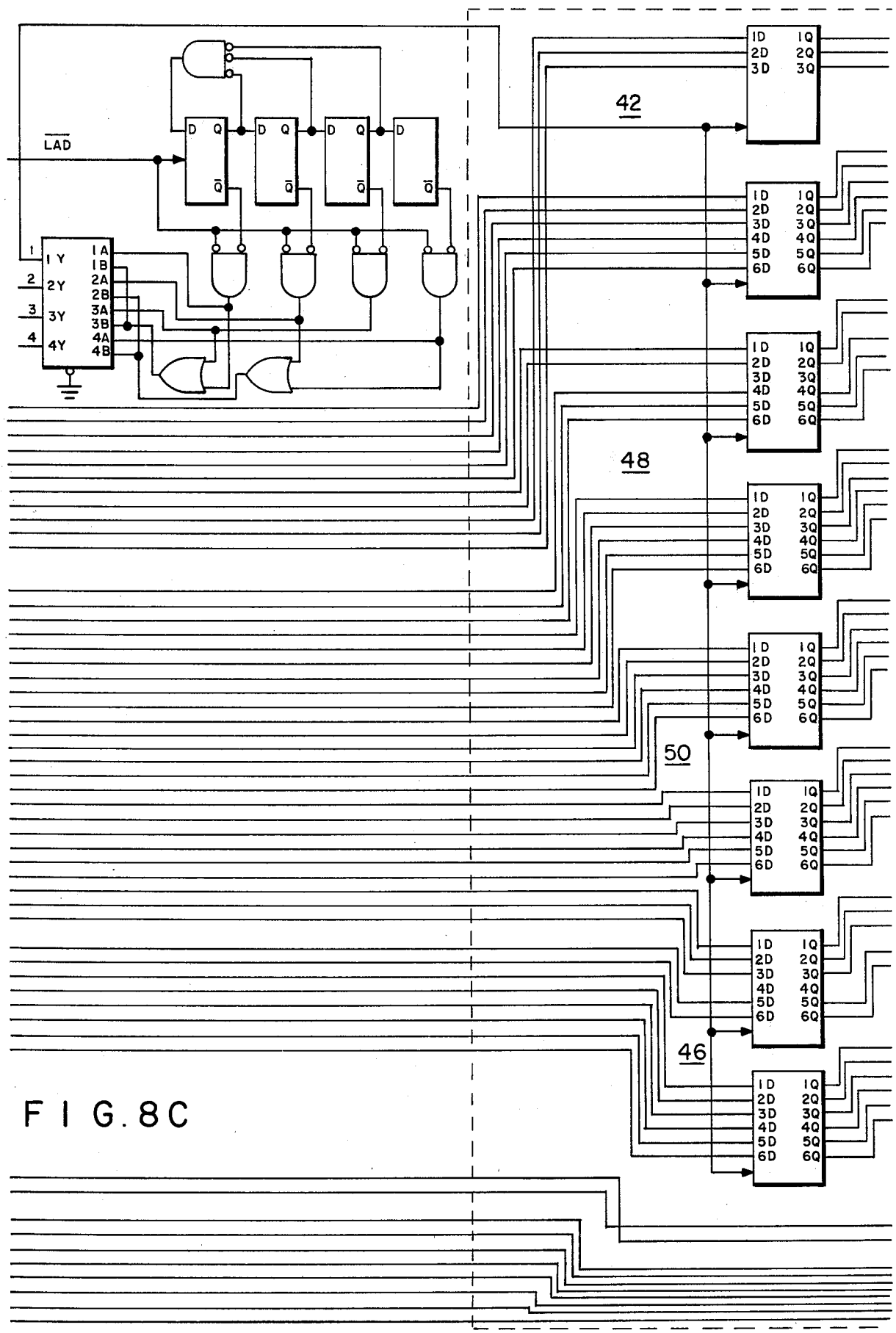

In FIG. 8, there is shown a detailed block diagram using commercially available integrated circuit chip packages of the system shown in FIG. 7. Thus, the eleven bit stylus address word is stored in a pair of latches used for the input data latch 32. This 11 bit address word is subsequently loaded by the LAD signal into both the high and the low latches (HL, LL) 36, 38 which are shown as four data accumulation latches in FIG. 8. A new eleven bit word is then loaded into the input data latch 32 by the Latch Data (LD) signal. This new data word is compared with the current contents of the data accumulation latches 36, 38 by the dual eleven bit comparators shown as three high comparators for high comparator 34 and three low comparators for low comparator 36. If the numerical value of this new data word is less than the value of the word in the low latch 38, the $A<B$ signal of the third low comparator goes high. On the next Latch Data clock signal, this new data word is loaded into the low latch 38 by the NAND and NOR gates used for the latch control 40. The high latch 36 is similarly updated if the new data word is greater than the current contents of the high latch 36. Finally, if the new data word is equal to or between the current high and low data words, no change takes place. In this way, the data accumulation latches 36, 38 are updated to record the maximum and minimum data words that occur between the LD signals. The LD signal occurs at the data collection rate of 50 KHz, and the LAD signal occurs as a function of the line print rate from the recording medium monitor 28. There is always an integral number of LD clocks between each LAD clock signal.

The outputs of the two data accumulation latches 36 and 38 represented by the four latch circuits shown in FIG. 8 are applied to the output control PROMS 52 and 54 shown as six PROM circuits in FIG. 8. The outputs from the data accumulation latches are also supplied to one of the trace segment generator input latches 42 and 46 under control of the LAD signal. Because the numerical value of the contents of the low latch 38 that addresses this memory must be less than or equal to the value of the contents of the high latch 36, there are only thirty-six input possibilities. The memory, thus, need only have thirty-four by twenty-four memory cells (864 bits). The storage pattern for this output control PROM is shown in FIG. 10. The output control PROM decodes the three most significant bits (MSB's) of each of the high and low data words to produce a pattern of bits that control the flow of data to the outputs from the trace segment generators. The Block Enable signal enables the data selectors of the appropriate blocks while the Block Data Select signal directs the enabled data selectors to the bus from which to select the data.

Figure 8D:
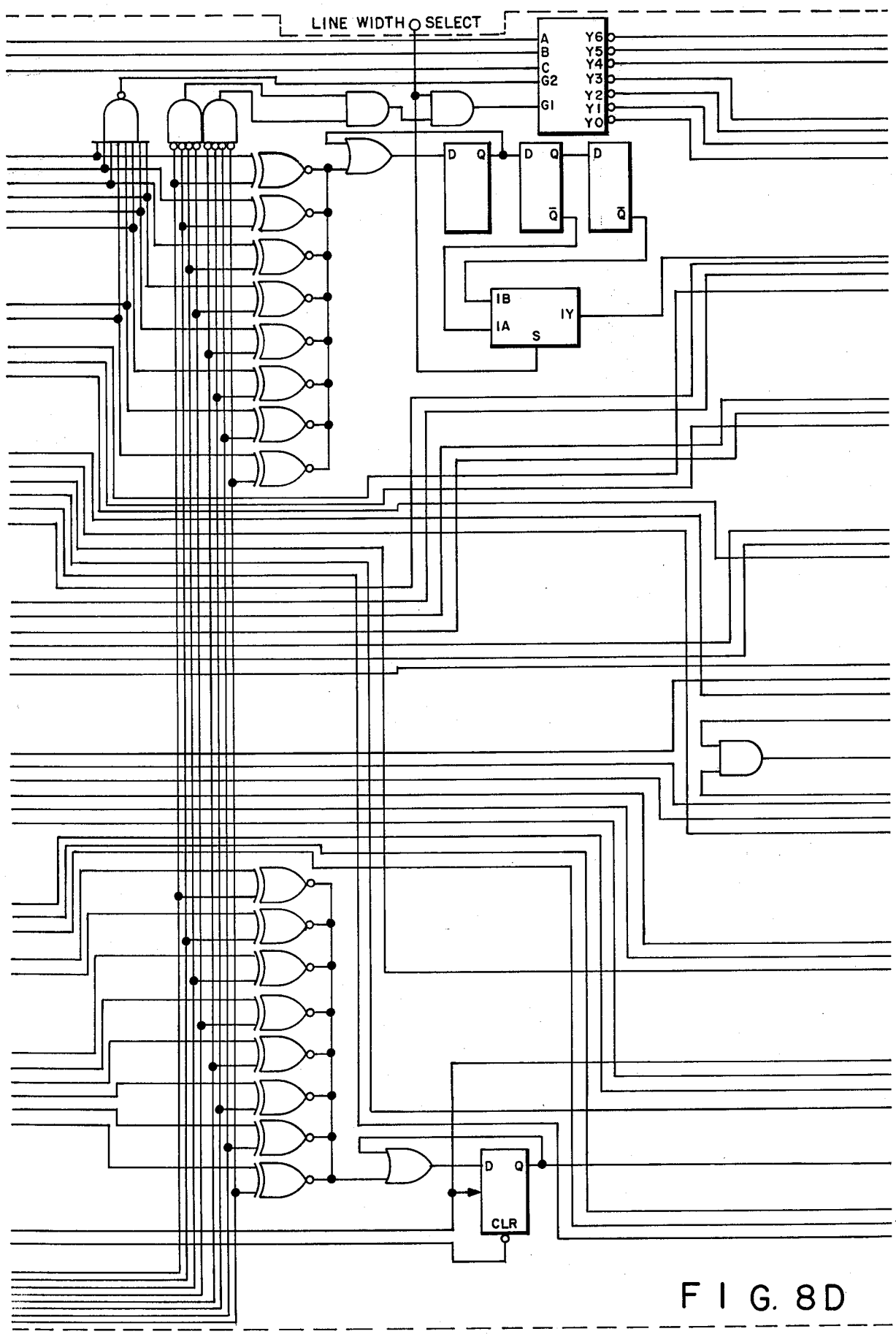

Each of the four Trace Segment Generators 44, 56, 58 and 60 contains a forty-three bit data latch shown in FIG. 8 as eight latch circuits. This comprehensive data latch includes the three MSB's of the contents of the high data accumulation latch 36, the eight least significant bits (LSB's) of both of the data accumulation latches 36, 38 for bus signal generation and the twenty-four bit output of the output control PROMS 52, 54. Each of these four sets of latches are clocked sequentially by the four control clock signals $\emptyset 1, \emptyset 2, \emptyset 3$ and $\emptyset 4$, from the trace segment generator control 45. The trace segment generator bus generation circuitry, i.e, the address counter 30, consists of a low edge and a high edge comparator and two sets of latches and is shown in FIG. 8A. The eight bit counter cycles through 256 counts during each recording cycle. The output of the counter is fed into each of two comparators shown as sixteen exclusive NOR gates in each of the four trace segment generator blocks. The count begins at zero and ends at 255. When the count is equal to the low edge count bus data stored in the trace segment generator input latch, the output of the exclusive NOR comparator shown in FIG. 8D goes high. On the next clock count, this data is clocked through the bus latch and the low edge bus (LEB) is locked high.

The operation of the High Edge Bus (HEB) is similar except that the data is delayed either one or two clock signals, depending on the state of the Line With Select input, and the data for the High Edge Bus is also inverted. The Both Edge Bus (BEB) is used only if the high and low latch contents have the same MSB's. The BEB is a logical "And" of the LEB and the HEB. The All Write Bus (AWB) is tied to a logic "high". Under the control of the output control PROM data stored in the trace segment generator input latch, each of the eight four to one data selectors 70 shown in FIG. 8D, chooses data from one of the data buses. If any block of styli is not writing at all, the corresponding data selector is disabled by the Block ENABLE signal stored in the trace segment generator's input latch. The outputs of each of the four trace segment generators are OR'ed together by the eight output OR gates to provide an output to each of the eight data outputs. The remaining four inputs to these OR gates are connected to the Block Overflow control of the four trace segment generators. The outputs BD0 through BD7 are serial outputs from respective NAND gates each addressing 256 recording styli. An Output Enable signal is applied to each of the output NAND gates to control the energization of the styli.

In summary, the min-max accumulator shown in FIGS. 7 and 8 has four trace segment generators (TSG). Since each TSG has storage, it can continue recording its segment after the next TSG has started recording its segment. The TSG's are operated to write their segments in sequence. The overall system operation starts by the LD pulse latching incoming data in the IDL. The Latch Control clocks LL and HL to load data from the IDL into HL and LL. The next data sample is loaded into the IOL and the HICOMP and LOCOMP compare the HL and LL outputs with the IDL output. If IDL>HL, the higher value is loaded into HL. If IDL<LL, the lower value is loaded into LL. The LAD signal clocks the HL and LL data into a set of latches in the TSG's. The BEP develops an eight bit output code from the 3 MSB's from the final contents of LL and HL to direct the energization of styli blocks. The BDSP also develops an eight bit output code from the 3 MSB's stored in the HL and LL to select either LEB, HEB, BEB or AWB. The outputs from BEP and BDSP are stored in latches in one of the TSG's along with the contents of LL and HL. After this data is stored, the IDL receives the next sample of input data and the above sequence is repeated for the next TSG whereby each TSG develops a set of signals for energizing the styli with each TSG recording in sequence to produce overlapping record segments. The TSG's are sequenced by a four phase clock from the TSG Control 45. Each time a new LAD occurs, one of the TSG's has new input data clocked into its latch. An address counter driving the LEB and HEB comparators counts the number of counts (256) required to scan the styli in each of eight blocks of styli. When the LEB comparator senses that the address bus equals the contents in a high data latch, the LEB comparator latches. Similarly, the HEB compares the address bus with the contents of a low data latch to latch upon an equality therebetween. The BEB signal is developed from the LEB and HEB bus signals. The LEB, HEB, BEB and AWB are connected to inputs of TSS OR gates to be routed under control of BEP and BDSP to output block of styli through output gates.

Accordingly, it may be seen, that there has been provided, in accordance with the present invention an improved multistylus recording system.

The embodiments of the invention in which an exclusive property or privilege is claimed are defined as follows:

1. A multistylus recorder comprising a multistylus recording head means having a plurality of recording styli arranged along a recording line, a recording medium transport means for moving a recording means past said head means, analog-to-digital converter means for producing digitized representations of an analog signal to be recorded, means for converting said digitized representations into digital addresses of one of said styli to be energized wherein said means for converting includes means for storing the highest one of said digitized representations, means for storing the lowest one of said digitized representations, means for comparing each of said digitized representations to said highest one and to said lowest one and means for substituting a new one of said digital representations for said highest one if said comparison indicates that said new one is higher and forsaid lowest one if said comparison indicates that said new one is lower and trace segment generator means for energizing said styli in response to said digital address to produce a recorded segment between and including the highest and lowest ones of said digital addresses.

2. A multistylus recorder as set forth in claim 1 wherein said transport means is arranged to move said medium at a right angle to said recording line.

3. A multistylus recorder as set forth in claim 1 wherein said transport means includes means for generating a recording means advance signal representation of an incremental advance of said medium to a recording position and means for applying said signal to said means for converting to control a conversion operation of said digitized representations.

4. A multistylus recorder as set forth in claim 3 wherein said segment generator means includes a plurality of trace segment generators arranged to be operated in sequence to produce a sequence of recorded segments and said advance signal is also applied to said segment generator means to sequentially enable said segment generators.

5. A recorder as set forth in claim 1 wherein said means for converting includes a ROM for storing data to be used for producing control signals to be used for controlling said generator means to utilize said digital representations.

6. A recorder as set forth in claim 1 wherein generator means includes means for storing addresses of said styli to be energized and energizing means for concurrently energizing ones of said styli having addresses stored in said means for storing.

7. A recorder comprising a multistylus recording head means having a plurality of recording styli arranged along a recording line, a recording medium transport means for moving a recording means past said head means, analog-to-digital converter means for producing digitized representations of an analog signal to be recorded, means for converting said digitized representations into digital addresses of one of said styli to be energized and trace segment generator means for energizing said styli in response to said digital address to produce a recorded segment between and including the highest and lowest ones of said digital addresses, wherein said styli are divided into blocks of styli which are concurrently sequentially addressed and concurrently energized by said generator means in response to said digital addresses from said means for converting.

8. A recorder as set forth in claim 7 wherein the number of said styli is 2048 and said blocks each include 256 styli.

9. A recorder as set forth in claim 8 wherein said trace segment generator means operates in one of three modes with a first mode having a recorded segment wholly within one of said block of styli, a second mode having a recorded segment wholly within two adjacent ones of said blocks of styli and a third mode having recording segment lying within at least three adjacent ones of said blocks of styli.

* * * * *